United States Patent [19]
Lindroos et al.

[11] Patent Number: 6,086,681
[45] Date of Patent: *Jul. 11, 2000

[54] METHOD FOR RECOVERY OF XYLOSE FROM SOLUTIONS

[75] Inventors: Mirja Lindroos, Kirkkonummi; Heikki Heikkila, Espoo; Juha Nurmi, Pinjainen; Olli-Pekka Eroma, Kotka, all of Finland

[73] Assignee: Xyrofin Oy, Helsinki, Finland

[*] Notice: This patent issued on a continued prosecution application filed under 37 CFR 1.53(d), and is subject to the twenty year patent term provisions of 35 U.S.C. 154(a)(2).

[21] Appl. No.: 08/727,393

[22] PCT Filed: Jun. 7, 1995

[86] PCT No.: PCT/FI95/00327

§ 371 Date: Oct. 11, 1996

§ 102(e) Date: Oct. 11, 1996

[30] Foreign Application Priority Data

Mar. 1, 1995 [FI] Finland ..................... 950957

[51] Int. Cl.[7] ................ C13K 1/02; C13F 3/00; C13F 1/00; C13F 1/02
[52] U.S. Cl. ................ 127/37; 127/30; 127/42; 127/58; 127/60; 127/61
[58] Field of Search ................. 127/30, 37, 42, 127/58, 60, 61

[56] References Cited

U.S. PATENT DOCUMENTS

| | | | |
|---|---|---|---|
| 3,780,017 | 12/1973 | Spalt et al. | 260/209 R |
| 3,784,408 | 1/1974 | Jaffe et al. | 127/37 |
| 3,981,739 | 9/1976 | Dmitrovsky et al. | 127/60 |
| 4,016,001 | 4/1977 | Hoks | 127/16 |
| 4,075,406 | 2/1978 | Melaja et al. | 536/1.11 |
| 4,168,988 | 9/1979 | Riehm et al. | 127/37 |
| 4,199,373 | 4/1980 | Dwivedi et al. | 127/60 |
| 4,297,146 | 10/1981 | Mise et al. | 127/60 |
| 4,534,800 | 8/1985 | Winstråm-Olsen | 127/12 |
| 4,595,418 | 6/1986 | Yoshino | 127/30 |
| 4,622,417 | 11/1986 | Barnett et al. | 560/117 |
| 4,631,129 | 12/1986 | Heikkila | 210/635 |
| 4,634,472 | 1/1987 | Niekamp et al. | 127/60 |
| 4,640,717 | 2/1987 | Shukla et al. | 127/58 |
| 4,681,639 | 7/1987 | Hinck | 127/30 |
| 4,816,079 | 3/1989 | Ahrens et al. | 127/60 |
| 4,888,060 | 12/1989 | Niekamp et al. | 127/60 |
| 4,895,601 | 1/1990 | Binder et al. | 127/58 |
| 4,938,804 | 7/1990 | Heikkila et al. | 127/60 |
| 4,955,363 | 9/1990 | Harju et al. | 127/46.1 |
| 5,004,507 | 4/1991 | Binder et al. | 127/58 |
| 5,076,853 | 12/1991 | Leleu | 127/58 |
| 5,084,104 | 1/1992 | Heikkila et al. | 127/46.2 |
| 5,133,807 | 7/1992 | De Cremoux | 127/15 |
| 5,281,279 | 1/1994 | Gil et al. | 127/46.1 |
| 5,340,403 | 8/1994 | Fields et al. | 127/37 |
| 5,730,877 | 3/1998 | Heikkila et al. | 210/659 |

FOREIGN PATENT DOCUMENTS

| | | | |
|---|---|---|---|
| 834079 | 3/1952 | Germany . | |
| 1 643 940 | 7/1967 | Germany . | |
| 2 206 293A | 1/1989 | United Kingdom | C13F 1/02 |
| WO 81/02420 | 9/1981 | WIPO | C07C 101/12 |
| WO 96/27028 | 9/1996 | WIPO . | |

OTHER PUBLICATIONS

Horn (Jun. 1977) "Dextrose: An Alternative to Sucrose in Panned Confections", *The Manufacturing Confectioner for June 1977*, 79–86.

*Primary Examiner*—Mark L. Bell
*Assistant Examiner*—Patricia L. Hailey
*Attorney, Agent, or Firm*—Scully, Scott, Murphy & Presser

[57] ABSTRACT

The invention relates to a method for the recovery of xylose from xylose-containing aqueous solutions containing 30–60% by weight of xylose on dissolved solids, in which method the solution is treated to produce a solution supersaturated with xylose, xylose is crystallized from the supersaturated solution and the xylose crystals are recovered.

29 Claims, No Drawings

METHOD FOR RECOVERY OF XYLOSE FROM SOLUTIONS

The present invention relates to a method for the recovery of xylose by crystallization from solutions having a comparatively low xylose purity. In particular, the invention relates to a method for recovering xylose in the form of a crystalline product from biomass-derived solutions. By employing the method of the invention, purification treatments on the solutions, such as decolouring, ion exchange and chromatographic separations that have been required in the prior art methods before the recovery of xylose, can be considerably diminished or entirely avoided. The need for auxiliary solvents can also be eliminated.

In the context of the present description and claims, xylose purity means the proportion of xylose in the dry solids contained in the solution or mixture and, if not otherwise stated, the purity is indicated as per cent by weight.

Xylose is a valuable raw material in the sweets and spices industries and particularly as a starting material in the production of xylitol. Xylose is formed in the hydrolysis of xylan-containing hemicellulose, for example in the direct acid hydrolysis of biomass, in enzymatic or acid hydrolysis of prehydrolysate obtained from biomass by prehydrolysis (with steam or acetic acid, for instance), and in sulphite cooking processes of the pulp industry. Vegetable materials rich in xylan include the wood material from wood species, particularly hardwood, such as birch, aspen and beech, various parts of grain (such as straw and husks, particularly corn and barley husks and corn cobs), bagasse, coconut shells, cottonseed skins, etc.

In conventional methods, it has only been possible to crystallize xylose if the xylose purity of the solution has been at least about 70% by weight on dry solids. In such cases, it has been necessary to initially purify the xylose-containing solution obtained as a result of the hydrolysis of vegetable-derived material to the required degree of purity by various ultrafiltration, ion exchange, decolouring, ion exclusion or chromatographic separation methods or combinations of such methods. Furthermore, auxiliary solvents reducing the solubility of xylose have been employed to crystallize xylose.

An alternative to the above methods for producing a xylose solution having sufficient purity required for xylose to crystallize is purification of xylan prior to its hydrolysation into xylose. In that case, it is expedient to pre-purify the material to be treated (removal of starch, pectin, proteins, lignin, etc.), followed by extraction with a KOH or NaOH solution and separation of hemicellulose from the solution by precipitation. This method has many steps and is cumbersome, as is apparent from Browning, B. L., *Methods of wood chemistry, II*, Interscience Publishers, New York, 1967, and Fry, S. C., *The Growing Plant Cell Wall: Chemical and Metabolic Analysis*, Longman Scientific & Technical Publishers, England, 1988.

Xylose is produced in large amounts for example in the sulphite cooking of a hardwood raw material in the pulp industry. Separation of xylose from such cooking liquors is described in U.S. Pat. No. 4,631,129 (Heikkilä, H.; Suomen Sokeri Oy), for instance. The method disclosed in this patent comprises two chromatographic separations, after which xylose can be recovered subsequent to the evaporation of the product fraction (xylose purity about 70% or more) by crystallization.

Acid hydrolysis of a xylan-containing material to produce xylose is disclosed for example in U.S. Pat. No. 4,075,406 (Melaja, A. J. & Hämäläinen, L.; Suomen Sokeri Oy) and U.S. Pat. No. 5,084,104 (Heikkilä, H. & Hyöky, G.; Cultor Ltd) and in the publications incorporated therein by reference. The hydrolysis is based on purification of hydrolysate by ion exclusion, decolouring, and chromatographic separation methods, and subsequent to the purification treatments xylose can be recovered from the product fraction after its evaporation by crystallization.

U.S. Pat. No. 4,168,988 (Riehm, T. & Hofenk, G; Instituut voor Bewaring en Verwerking van Landbouwprodukten) describes xylose production by hydrolysis of annual plant residues. Besides filtration of the hydrolysate, the crystallization of xylose requires decolouring and purification of the hydrolysate by treatment with cation and anion exchange resins.

DE Offenlegungsschrift 1 643 940 (Eickenmeyer, R. & Scholler, H.) teaches that crystalline xylose is recovered from a hydrolysate of pentosan-containing and cellulose-containing natural materials by crystallization from a syrup containing at least about 70% of xylose. The syrup is introduced into a crystallizer at a temperature of 60–70° C., and a crystal mass comprising 15–33% of crystallized xylose on the amount of xylose introduced into the crystallizer is withdrawn from the crystallizer at 48–52° C. Crystals are separated from the crystal mass by centrifugation, and the mother liquid, the amount of which is 300–100% of fresh syrup introduced into the system, is combined with the starting material hydrolysate. The mixture of mother liquid and hydrolysate thus obtained is treated with a cation exchanger and an anion exchanger, and after a subsequent decolouring treatment the mixture is evaporated to obtain a syrup for supply to the crystallizer. The method thus comprises, in addition to cumbersome purification treatments, very extensive recycling. The small amount of xylose recovered in one crystallization (i.e. low yield on xylose supplied to the crystallizer) is stated to be a result of the fact that when the temperature drops below about 48° C., the crystallization rate becomes very low, because the viscosity of the solution increases considerably when the temperature drops.

Khristov, L. P. et al. [Some Possibilities for Efficient Use of Prehydrolyzates from Viscose-Grade Pulp Manufacture, Gidroliznaya i Lesokhimicheskaya Promyshlennost, No. 6, 1989, pp. 30–31 (English translation: ISSN 0730–8124, Hydrolysis and Wood Chemistry USSR, No. 6, 1989, pp. 62–66, Allerton Press Inc.), and Some Possibilities for Using Prehydrolyzates from the Production of Viscose Pulp, Pap. Cellul. 45 (1990) No. 6, pp. V42–V44] have studied a method by which crystalline xylose and glucose isomerase are prepared from a prehydrolysate obtained from the preparation process of viscose pulp produced from beech; glucose isomerase is obtained by way of biosynthesis with a microorganism utilizing xylose substrate. Also this method comprises several hydrolysate pretreatment steps (use of activated charcoal in hydrolysing the prehydrolysate with sulphuric acid, precipitation of colloid particles by way of vigorous mechanical stirring and neutralization of the mixture, decolouring with ion exchange resin). After evaporation, xylose can be crystallized from the hydrolysate thus purified.

Auxiliary solvents reducing the solubility of xylose, such as methanol, ethanol or acetic acid, have also been employed to crystallize xylose from xylose-containing solutions. Such an approach is disclosed for instance in U.S. Pat. No. 3,784,408 (Jaffe, G. M., Szkrybalo, W. & Weinert, P. H.; Hoffmann-La Roche), disclosing that hydrolysate is purified by ion exchange and methanol is added to the evaporated hydrolysate to crystallize the xylose. U.S. Pat. No. 3,780, 017 (Spalt, H. A. et al.; Masonite Corporation) teaches that impurities are precipitated from concentrated hydrolysate with a water-soluble alcohol, and after evaporation of the alcohol solution acetic acid is added thereto to crystallize the xylose.

The object of the present invention is the recovery of xylose from solutions having a comparatively low xylose content on dry solids, i.e. 30–60% by weight on dissolved solids, by a simple method significantly reducing the number of separation processes on the solution that are required in the prior art methods, or completely avoiding such processes and the use of auxiliary solvents, thus making the method considerably more economic than the prior art methods. Alternatively, xylose can be recovered in the form of a crystalline product from xylose solutions that are difficult to purify for example by chromatographic separation which, therefore, does not yield xylose purities required in the prior art crystallization methods. In particular, the object of the invention is such a method for recovery of xylose from hydrolysis products of biomass, which may also be xylose-containing by-product fractions obtained in the wood processing industry, such as sulphite cooking liquor or a part thereof or a concentrate obtained therefrom, for instance a concentrate chromatographically produced from sulphite cooking liquor or a prehydrolysate portion of cooking liquor or a posthydrolysate or ultrafiltration permeate thereof.

These objects are achieved with the method of the invention, in which a xylose-containing solution comprising 30–60% by weight of xylose on dissolved solids is treated to produce a solution supersaturated with xylose wherefrom xylose is crystallized, and the xylose crystals are recovered.

It has now been found that when supersaturation is increased and the proportion of nucleation is increased, xylose can be recovered in the form of a crystalline product advantageously and in high yields from biomass-derived solutions wherefrom it has not been possible to recover xylose previously, and the method of the invention is based on this finding.

In the context of the present description and claims, supersaturation of the solution in respect of xylose means the dimensionless ratio of the measured xylose content and the solubility of xylose, which is calculated from the equation:

$$s = \frac{\text{xylose content in sample solution}}{\text{solubility of xylose at temperature of sample solution}}$$

wherein s is supersaturation, and the unit of measurement for xylose content and xylose solubility is g/100 g of water. The terms "supersaturated" and "supersaturation" refer to the saturation of the solution in respect of xylose only.

Typically, the solution is supersaturated by concentration. A preferred method of concentration is evaporation under subatmospheric pressure; also cooling can be employed to achieve the desired supersaturation. In accordance with a preferred embodiment of the invention, the solution is concentrated to a dry solids content of 75–95% by weight. If the xylose purity of the solution to be treated is in the range 30–50%, the dry solids content of the supersaturated solution is preferably 82–95% by weight, most preferably 83–92% by weight. If the xylose purity of the solution to be treated is in the range 40–60%, the dry solids content of the supersaturated solution is preferably 75–89% by weight, most preferably 78–86% by weight. The supersaturated solution thus obtained will also be termed crystallization mass in the following.

Generally, cooling is employed to form xylose crystals from a supersaturated solution; the quantity and crystallization propensity of the solution to be treated affect the cooling time and rate and the manner of formation of xylose crystals. Normally cooling is performed during 20–100 hours or less, in a temperature range 80–20° C., preferably in the range 65–25° C., or at a rate 0.3° C./h–5° C./h, respectively.

Prior to initiation of cooling, finely ground xylose for seed crystals is preferably added to the solution, but crystallization can also be initiated by spontaneous seeding. The term "full seeding" employed herein-below in connection with seeding is commonly known in the field, and is calculated on the size of the seed crystal, the crystal size of the desired final product and the yield, presuming that the number of crystals does not vary.

If the xylose purity of the solution to be treated is in excess of 40% on dry solids, according to a preferred embodiment of the invention cooling is carried out at a comparatively slow rate, during about 30–100 hours. In such a case, seed crystals are generally employed in an amount approximately corresponding to full seeding, and the crystallization of xylose from the solution is largely dependent on crystal growth. Herein super-saturation during the crystallization is 1.1–1.7, preferably 1.2–1.4.

When the solution to be treated has a low xylose purity, about 30–50%, in accordance with a preferred embodiment of the invention the amount of seed crystals shall be high, at least ten-fold relative to full seeding. The separation of xylose from the solution is in this case mainly based on nucleation and less on crystal growth. In the following, this method is termed precipitation crystallization and also precipitation. Herein supersaturation during the crystallization is 1.4–3.0, preferably 1.5–2.5. The crystal size (length of crystals) obtained in the precipitation is typically 10–100 $\mu$m.

A preferred way of carrying out precipitation crystallization in accordance with the invention is cooling of the seeded crystallization mass at a relatively high rate, in a time of about 10–50 hours or less, to precipitation conditions. Herein the temperature of the crystallization mass is typically 20–50° C., depending on the dry solids content of the crystallization mass. Under precipitation conditions, the apparent viscosity of the crystallization mass is in the range 100–600 Pas. The suspension is stirred in the precipitation range until a sufficient degree of crystallization (yield, decrease in xylose purity of mother liquid) has been reached. Thus, precipitation of 1–4 days or even less can produce a xylose purity of about 20% or less in the mother liquid.

Thereafter the supersaturation of the crystallization mass is diminished by increasing the temperature and/or diluting the crystallization mass with water or a xylose-containing solution until the viscosity of the crystallization mass has decreased to a sufficient degree for effective separation of crystallized matter. A typical viscosity of the crystallization mass is 5–100 Pas. The crystals can be separated by filtration, decanting, centrifugation etc., preferably by filtration. The mother liquid (i.e. run-off) thus separated has been reduced to a very low xylose content (as low as 16% on dry solids). The xylose purity of the crystal fraction obtained is typically 60–90% on dry solids, depending on the xylose purity of the crystallization mass and the execution of the process, and it can easily be purified, if necessary, by crystallization techniques in accordance with the present invention or by normal techniques. The purity of the crystal fraction can be improved by displacing an amount of mother liquid with a solvent or with air.

In a special embodiment of the invention, crystalline xylose is recovered from hydrolysate obtained from the hydrolysis of xylan-containing biomass, wherefrom solid impurities have been separated mechanically, for instance, by methods such as filtration. Such a hydrolysate can be obtained by hydrolysing a xylan-containing biomass or a prehydrolysate obtained from such a biomass by treatment for example with steam or acetic acid, with organic acids, such as formic or acetic acid, inorganic acids, such as hydrochloric acid, sulphuric acid or sulphur dioxide, or mixtures thereof, or by enzymatic methods. The methods of preparing such xylose-containing biomass hydrolysates are known per se for example from the above-stated publications and the references incorporated therein. Enzymatic hydrolysis of a prehydrolysate obtained by steam explosion from a wood material is disclosed in international patent application WO 91/03566 (Cultor).

It has not been possible to crystallize xylose from solutions having a purity of less than about 70% by the prior art methods without subjecting the solutions to cumbersome purification treatments. The novel method now developed is capable of achieving crystallization with xylose purities as low as about 30% on dry solids.

If the solution to be treated is rich in sulphate ions, being for instance a hydrolysate of a biomass obtained using sulphuric acid, in accordance with a preferred embodiment the excess sulphate is removed, preferable by precipitation for instance in the form of calcium sulphate, and by filtration. Prior to the sulphate precipitation, the dry solids content of the hydrolysate should be in the range 10–50% by weight, preferably 25–40% by weight. If necessary, the hydrolysate is evaporated to adjust the dry solids content to be in this range.

Prior to the crystallization of xylose, the solution (the sulphate possibly contained in the solution has been removed) is evaporated, so that the solution obtained is supersaturated with xylose at temperatures as high as about 50–70° C. A suitable dry solids content is for example 75–89% by weight, preferably 78–86% by weight.

In this evaporation, furfural and acetic acid possibly contained in the solution (e.g. biomass hydrolysate) are also removed.

Xylose is crystallized from the viscose supersaturated solution—i.e. crystallization mass—obtained in the evaporation by the method in accordance with the invention.

If the xylose purity of the solution to be treated is 40–60% by weight, seed crystals are added to the crystallization mass at an initial temperature of 50–75° C., preferably 55–70° C. Thereafter the crystallization mass is subjected to controlled cooling in a crystallizer commonly used for example in the sugar industry. A suitable crystallization program is, for instance, cooling from 65° C. to 25° C. during about 60 hours.

The xylose crystals formed during cooling are separated from the mother liquid preferably by centrifugation. During the centrifugation, the crystals may be washed with a small amount of water or xylose solution. Thus a crystal fraction having a purity as high as 98% or even higher can be obtained. If desired, the fraction can additionally be easily purified by recrystallization. The run-off (i.e., the liquid fraction mechanically separated from the crystallization mass) can be treated further by the precipitation crystallization step in accordance with the invention.

If the xylose purity of the dry solids contained in the solution to be treated is in the range of about 30–50% by weight on dry solids, the precipitation crystallization described above is performed first, and depending on the purity of the small-crystal fraction obtained, xylose is crystallized in the conventional manner or in accordance with the invention as described above for xylose purities of 40–60% by weight. The run-off from the precipitation step is withdrawn from the process.

In accordance with the invention, crystalline xylose of a very high purity is obtained by a method that is significantly simpler, more effective and more economical than the prior art methods for preparing crystalline xylose, in which several purification and separation treatments are necessary before the xylose can be crystallized. Furthermore, the method of the invention yields crystalline xylose from solutions from which xylose could not previously be obtained, since it was not possible to separate from the solution a fraction sufficiently enriched with xylose by chromatographic methods, for instance.

Preferred embodiments of the method of the invention will be described in detail by means of the following examples, which are not to be construed as limiting the scope of the invention.

The analysis results given in the examples have been obtained by the following methods:

The dry solids contents were determined by the Karl Fisher titration method (DS) or by the refractive method (Rds).

Carbohydrates were analyzed by liquid chromatography (HPLC) employing columns in which the ion exchange resin was in the $Na^+$ and $Pb^{2+}$ forms, or with PEDLC (i.e., HPLC employing a pulse electrochemical detector). The acetic acid content was analyzed with HPLC (the ion exchange resin in the columns was in the $H^+$ form), the sulphate content by ion chromatography and the calcium content with ICP (Inductively Coupled Plasma Spectrophotometry). The oligosaccharides referred to in the test results also include the disaccharides. Colour was determined by adapting the ICUMSA method [cf. Sugar Analysis; Official and Tentative Methods Recommended by the International Commission for Uniform Methods of Sugar Analysis (ICUMSA), ed. Schneider, F., ICUMSA, Peterborough, England, 1979, pp. 125–128] at a pH of 5 and by performing the measurement from a filtered solution (0.45 μm) at 420 nm. The UV absorbances of the solutions were measured at wavelengths 210 nm, 225 nm and 280 nm.

EXAMPLE 1

A) Preparation of Bydrolysate

The raw material was birch chips having the following analysis (percentages on dry solids):

| | |
|---|---|
| Dry solids content | 66 g/100 g |
| Dry solids soluble in acetone | 2.6% |
| Klason lignin | 19.2% |
| Carbohydrates after hydrolysis: | |
| glucose | 41.1% |
| xylose | 21.0% |
| galactose + rhamnose | 1.3% |
| arabinose | 0.4% |
| mannose | 1.5% |

To prepare a hydrolysate, birch chips were hydrolysed in a 24 l autoclave (Scholz & Co. Apparatebau 442 Coesfeld 1.W. 1977) using direct steam heating, and thus the ratio solids/liquid changed during the hydrolysis. The hydrolysis was performed at 140° C. with sulphuric acid. The chip batches were hydrolysed with sulphuric acid solutions of different concentrations (concentrations between 1.25% and 7% by weight). The hydrolysates in which the ratio of neutral disaccharides and xylose was <5% were combined.

The xylose yield into the hydrolysate thus obtained was about 10% on wood dry solids.

The analysis results of the hydrolysate are given in Table 1 below.

B) Recovery of Xylose from Hydrolysate

The hydrolysate obtained in step A above was filtered and evaporated without any preceding pH adjustment to a dry solids content of 27% by weight.

Sulphate was precipitated from the evaporated hydrolysate at 60° C. by adding an aqueous slurry of calcium oxide with simultaneous stirring, so that the total molar amount of calcium (i.e., total amount of added calcium and calcium present in the hydrolysate, which had been dissolved from the chips) was equal to the molar amount of sulphate in the hydrolysate. The pH change was monitored during the addition of calcium oxide. After the addition, stirring was continued at 60° C. for one hour, the solution was cooled and the precipitate was removed by vacuum filtration. The pH remained in the acidic range during the entire test; the pH of the filtrate obtained was 3.4.

Analysis results obtained for the hydrolysate after evaporation and after sulphate precipitation are shown in Table 1.

TABLE 1

|  | Filtered hydrolysate | Evaporated hydrolysate | Hydrolysate after $SO_4^{2-}$ precipitation |
|---|---|---|---|
| Dry solids content (DS), g/100 g | 6.4 | 27.8 | 23.2 |
| pH | 1.4 | 0.7 | 3.3 |
| Colour, ICUMSA | 35500 | 45000 | 58400 |
| UV 210 nm, 1/cm | 240 | 1370 | 1320 |
| UV 225 nm, 1/cm | 130 | 650 | 620 |
| UV 280 nm, 1/cm | 140 | 270 | 260 |
| Ca, % on dry solids | 0.10 | 0.14 | 0.6 |
| $SO_4^{2-}$, % on dry solids | 8.8 | 12.8 | 0.6 |
| Carbohydrate content, % on dry solids | 0.48 | 0.64 | 2.2 |
| oligosaccharides |  |  |  |
| glucose | 2.5 | 3.6 | 5.7 |
| xylose | 34.9 | 48.8 | 57.8 |
| galactose + rhamnose | 2.3 | 3.3 | 4.6 |
| arabinose | 0.6 | 0.9 | 1.7 |
| mannose | 1.6 | 2.1 | 4..3 |
| Acetic acid, % on dry solids | 12.1 | 5.1 | 5.0 |

The filtrate (32 kg) obtained above from the filtration of a sulphate precipitate was heated to a temperature of 40° C. and filtered using diatomaceous earth (Kenite 300) as an aid. The filtrate was evaporated in a rotating evaporator (Büchi Rotavapor R-151) to a refractometric dry solids content (RDs) of 85 g/100 g. The crystallization mass obtained was transferred into a 6 l cooling crystallizer at a temperature of 65° C. When the crystallization mass had reached the temperature of 65° C., it had a supersaturation of 1.27. Xylose seed crystals (manufacturer Xyrofin Ltd., grain size 15 μm) were added to the crystallization mass in an amount of 0.01% on the dry solids of the mass. After about one hour, a linear cooling programme from 65° C. to 25° C. was started; the programme took about 60 hours to complete.

During the cooling, the temperatures of the crystallization mass and the cooling water and the refractive index of the mother liquid were monitored. Crystallization was further monitored by means of microscopic photographs of the crystallization mass.

The supersaturation during the cooling varied in the range 1.44–1.65.

After about two hours from completion of the cooling programme, the crystallization mass was centrifuged (Hettich Roto Silenta II centrifuge, basket diameter 23 cm; 0.15 mm openings) for five minutes at a speed of rotation of 3000 min$^{-1}$. The crystallization mass was subjected to three different centrifugations:

1) by using a filter textile inside the basket; no washing of the crystal cake
2) no filter textile; washing of cake with 20 ml of water; and
3) no filter textile; washing of cake with 80 ml of water.

The results are shown in Tables 2 and 3 below, in which the terms and abbreviations have the following meanings:

Mass=crystallization mass

Purity=xylose purity

Feed=dilute hydrolysate after removal of sulphate precipitate

Begin=sample of crystallization mass before beginning of cooling

End=sample of crystallization mass after completion of cooling

Cake 0=cake from centrifugation No. 1 (no washing with water)

Run-off 0=run-off from centrifugation No. 1

Cake 20=cake from centrifugation No. 2 (washing with 20 ml of water)

Run-off 20=run-off from centrifugation No. 2

Cake 80=cake from centrifugation No. 3 (washing with 80 ml of water)

Run-off 80=run-off from centrifugation No. 3 pH 1:1=pH determined from sample diluted with water in ratio 1:1 pH 5%=pH determined from sample diluted to RDs 5%

Cond.=conductivity determined from RDs 5% sample

Ash=ash content calculated from conductivity by using sucrose coefficient for sulphate ash.

Yield RDs/RDs=percentage of cake dry solids on dry solids of crystallization mass Yield X/X=yield RDs/RDs divided by the xylose purity of the crystallization mass sample and multiplied by the purity of the cake.

As will be seen from the results in Tables 2 and 3, the purity of the xylose obtained was as high as 93.4%. The product obtained from crystallization can, if necessary, be purified further by recrystallization, which can be easily and rapidly performed by known methods.

TABLE 2

Results of different centrifugations

|  | Centrif. 1 no washing | Centrif. 2 washing 20 ml | Centrif. 3 washing 80 ml |
|---|---|---|---|
| g of mass to centrifuge | 564 | 653 | 573 |
| Dry solids content of mass (DS), g/100 g | 85.1 | 85.1 | 85.1 |
| Purity of mass, % on dry solids | 60.4 | 60.4 | 60.4 |
| Crystal cake, g | 187 | 148 | 86 |
| Dry solids content of cake (DS), g/100 g | 93.6 | 94.4 | 93.8 |
| Purity of cake, % on dry solids | 86.6 | 91.8 | 93.4 |
| Purity of run-off, % on dry solids | 46.7 | 47.5 | 51.1 |
| Yield in centrifugation, % |  |  |  |
| RDs/RDs | 36 | 25 | 17 |
| X/X | 52 | 38 | 26 |

TABLE 3

Analysis results of crystallization

|  | Feed | Begin | End | Cake 0 | Run-off 0 | Cake 20 | Run-off 20 | Cake 80 | Run-off 80 |
|---|---|---|---|---|---|---|---|---|---|
| Dry solids content (DS), g/100 g | 24.0 | 81.1 | 85.1 | 93.6 | 72.2 | 94.4 | 72.2 | 93.8 | 66.1 |
| ph 1:1 | 3.4 | 3.3 | 3.3 | 3.2 | 3.4 | 3.2 | 3.3 | 3.1 | 3.4 |
| ph 5% | 3.5 | 3.6 | 3.6 | 3.5 | 3.6 | 3.6 | 3.6 | 3.6 | 3.6 |
| Cond., mS/cm | 1.6 | 1.5 | 1.5 | 1.3 | 1.6 | 1.3 | 1.6 | 1.5 | 1.5 |
| Ash, % | 2.8 | 2.7 | 2.7 | 2.2 | 2.6 | 2.3 | 2.8 | 2.6 | 2.6 |
| Colour, ICUMSA | 61000 | 75000 | 94000 | 43600 | 120000 | 52400 | 120000 | 38400 | 109000 |
| UV 280 nm, 1/cm | 260 | 540 | 740 | 330 | 840 | 230 | 800 | 190 | 675 |
| UV 225 nm, 1/cm | 620 | 1270 | 1300 | 700 | 1470 | 470 | 1410 | 400 | 1190 |
| UV 210 nm, 1/cm | 1320 | 2690 | 2640 | 1430 | 2990 | 970 | 2880 | 810 | 2415 |
| Carbohydrate content, % on dry solids (DS) oligosaccharides | 2.2 | 2.2 | 1.5 | 1.0 | 2.2 | — | 2.4 | — | 2.1 |
| glucose | 5.7 | 5.7 | 5.9 | 1.8 | 8.0 | 1.1 | 7.9 | 0.7 | 7.4 |
| xylose | 57.8 | 60.6 | 60.4 | 86.6 | 46.7 | 91.8 | 47.5 | 93.4 | 51.1 |
| galact. + rhamn. | 4.6 | 4.6 | 4.6 | * | 5.7 | * | 5.6 | * | 5.5 |
| arabinose | 1.7 | 1.6 | 1.7 | 0.7 | 2.1 | 0.5 | 2.1 | 0.3 | 2.1 |
| mannose | 4.3 | 4.4 | 4.6 | 1.4 | 5.6 | 0.8 | 5.5 | 0.5 | 5.4 |

*included in the xylose content.

EXAMPLE 2

The xylose-containing solution to be treated was a xylose fraction obtained from a magnesium-base sulphite cooking liquor of beechwood by chromatographic separation (substantially in accordance with step 1 of the process described in U.S. Pat. No. 4,631,129). The xylose fraction contained about 7 kg of dry solids and had a xylose content of 44% on dry solids (RDs). The solution was evaporated in a rotating evaporator at 70° C. to a dry solids content of about 88% by weight.

The crystallization mass obtained was seeded in a 6 l cooling crystallizer at 70° C. at a supersaturation of 1.10, by adding 0.8 g of ground dry xylose (mean particle size 15 μm). The crystallization mass was subjected to linear cooling from 70° C. to 25° C. during 62 hours.

The crystallization process was monitored as in Example 1. The supersaturation during cooling was nearly invariant, 1.50.

After about six hours from completion of the cooling programme, the crystallization mass was centrifuged as in Example 1.

The results are shown in Tables 4 and 5 below, in which the terms and abbreviations have the same meanings as in Example 1. The abbreviation Centr. means a sample of crystallization mass to be supplied to the centrifuge.

TABLE 4

Results of different centrifugations

|  | Centrif. 1 no washing | Centrif. 2 washing 20 ml | Centrif. 3 washing 80 ml |
|---|---|---|---|
| Mass to centrifuge, g | 1074 | 1094 | 1097 |
| Crystal cake, g | 166 | 174 | 137 |
| Purity of cake, % on dry solids (RDs) | 80.5 | 83.8 | 87.2 |
| Yield in centrifugation, % |  |  |  |
| RDs/RDs | 17 | 17 | 14 |
| X/X | 31 | 32 | 28 |

TABLE 5

Analysis results of crystallization

|  | Begin | Centr. | Cake 0 | Run-off 0 | Cake 20 | Run-off 20 | Cake 80 | Run-off 80 |
|---|---|---|---|---|---|---|---|---|
| Dry solids content (RDs), g/100 g | 87.4 | 88.0 | 95.6 | 85.6 | 95.4 | 82.3 | 96.9 | 76.3 |
| pH 1:1 | 2.8 | 2.8 | 3.0 | 2.8 | 3.0 | 2.8 | 3.1 | 2.8 |
| pH 5% | 2.3 | 2.4 | 2.5 | 2.3 | 2.5 | 2.3 | 2.5 | 2.3 |
| Cond., mS/cm | 2.01 | 1.95 | 0.88 | 2.25 | 0.80 | 2.20 | 0.64 | 2.22 |
| Ash, % | 3.62 | 3.51 | 1.58 | 4.05 | 1.44 | 3.96 | 1.14 | 4.00 |
| Colour, ICUMSA | 5250 | 6700 | 2260 | 7360 | 1950 | 7550 | 1400 | 7500 |
| Carbohydrate content, % on dry solids (RDs) oligosaccharides | — | 1.8 | 0.4 | 0.4 | 0.5 | 0.8 | 0.4 | 0.6 |

TABLE 5-continued

Analysis results of crystallization

|  | Begin | Centr. | Cake 0 | Run-off 0 | Cake 20 | Run-off 20 | Cake 80 | Run-off 80 |
|---|---|---|---|---|---|---|---|---|
| glucose | 4.0 | 4.3 | 1.9 | 4.8 | 1.8 | 4.6 | 1.6 | 4.6 |
| xylose | 45.9 | 43.4 | 80.5 | 32.0 | 83.8 | 33.5 | 87.2 | 34.2 |
| galact. + rhamn. | 4.2 | 4.0 | <0.1 | 4.5 | <0.1 | 5.6 | — | 4.3 |
| arabinose | — | — | — | — | — | — | — | — |
| mannose | 5.7 | 4.9 | 1.5 | 5.5 | 1.3 | 5.5 | 0.9 | 5.4 |

EXAMPLE 3

This crystallization test was performed employing a xylose solution having a xylose content of about 55% on dry solids. The solution was prepared by adding a crystal cake obtained from Example 6 below to a xylose fraction obtained from a magnesium-base sulphite cooking liquor of beechwood by chromatographic separation (as in Example 2) and having a xylose content of 35% on dry solids.

The procedure was similar to that of Example 2, with the following exceptions:

The solution was evaporated at 60° C. to a dry solids content of 81.5% by weight, the crystallization mass was seeded at 55° C. at a supersaturation of 1.13, and the crystallization mass was subjected to linear cooling from 55° C. to 20° C. during 60 hours.

The crystallization process was monitored as in Example 1. The supersaturation during the cooling was nearly invariant, 1.15.

After the cooling programme was completed, the crystallization mass was centrifuged, both without washing of the cake and washing the cake with water (20 ml and 80 ml of water) as in Examples 1 and 2.

The results are shown in Tables 6 and 7 below, in which the terms and abbreviations have the same meanings as in Examples 1 and 2.

TABLE 6

Results of different centrifugations

|  | Centrif. 1 no washing | Centrif. 2 washing 20 ml | Centrif. 3 washing 80 ml |
|---|---|---|---|
| Mass to centrifuge, g | 889 | 1067 | 1118 |
| Crystal cake, g | 205 | 230 | 201 |
| Purity of cake, % on dry solids (RDs) | 97.9 | 99.0 | 99.7 |
| Yield in centrifugation, % |  |  |  |
| RDs/RDs | 28 | 26 | 22 |
| X/X | 50 | 47 | 40 |

TABLE 7

Analysis results of crystallization

|  | Begin | Centr. | Cake 0 | Run-off 0 | Cake 20 | Run-off 20 | Cake 80 | Run-off 80 |
|---|---|---|---|---|---|---|---|---|
| Dry solids content (RDs), g/100 g | 81.3 | 81.5 | 98.6 | 76.9 | 98.9 | 75.0 | 98.9 | 71.4 |
| pH 1:1 | 3.3 | 3.3 | 3.6 | 3.3 | 3.8 | 3.3 | 4.0 | 3.3 |
| pH 5% | 2.8 | 2.9 | 3.2 | 2.8 | 3.2 | 2.7 | 3.2 | 2.8 |
| Cond., mS/cm | 2.71 | 2.71 | 0.31 | 3.42 | 0.16 | 3.41 | 0.07 | 3.29 |
| Ash, % | 4.88 | 4.88 | 0.55 | 6.16 | 0.29 | 6.14 | 0.13 | 5.92 |
| Colour, ICUMSA | 15000 | 15000 | 1050 | 21000 | 475 | 20400 | 160 | 18600 |
| Carbohydrate content, % on dry. solids (RDs) | 5.7 | 5.9 | — | 8.9 | — | 7.8 | — | 7.5 |
| oligosaccharides |  |  |  |  |  |  |  |  |
| glucose | 3.1 | 3.1 | 0.8 | 4.1 | 0.7 | 4.1 | 0.5 | 4.1 |
| xylose | 54.5 | 54.2 | 97.9 | 37.7 | 99.0 | 38.7 | 99.7 | 40.6 |
| galact. + rhamn. | 2.8 | 2.7 | — | 3.3 | — | 3.3 | — | 3.2 |
| arabinose | — | — | — | — | — | — | — | — |
| mannose | 2.8 | 2.7 | 0.3 | 3.8 | 0.2 | 3.8 | — | 3.6 |

EXAMPLE 4

The procedure was substantially similar to that of Example 2, with the following exceptions:

The xylose-containing solution to be treated was a xylose fraction obtained from a calcium-base sulphite cooking liquor of birch by chromatographic separation (the ion exchange resin in the columns was in the Na⁺ form, cf. U.S. Pat. No. 4,631,129) and having a xylose content of 56.8% on dry solids (RDs). The solution was evaporated to a dry solids content (RDs) of 84.1 g/100 g, and the crystallization mass obtained was seeded at a supersaturation of 1.18 by adding ground dry xylose in a quantity of 0.15% of the amount of xylose in the crystallization mass. The crystallization mass was cooled from 62° C. to 25° C. during 85 hours.

The supersaturation during cooling increased gradually to 1.38. The crystallization mass was centrifuged after one hour from completion of the cooling programme at a speed of rotation of 3000 min$^{-1}$, both without washing the cake and washing the cake with water (20 ml and 80 ml of water). Furthermore, centrifugation was performed at a speed of rotation of 4000 min$^{-1}$ for four minutes, in which connection the cake was washed with 20 ml of water.

The results are shown in Tables 8 and 9 below, in which the terms and abbreviations have the same meanings as in the previous examples. Furthermore, centrifugation performed at a speed of rotation of 4000 min$^{-1}$ is called centrifugation 4 and the cake obtained therefrom is called Cake 20**.

TABLE 8

Results of different centrifugations

| | Yield in centrifugation, % | |
|---|---|---|
| | RDs/RDs | X/X |
| Centrifugation 1, no washing | 25 | 42 |
| Centrifugation 2, washing 20 ml | 23 | 39 |
| Centrifugation 3, washing 80 ml | 19 | 32 |
| Centrifugation 4 | 23 | 40 |

TABLE 9

Analysis results of crystallization

| | Begin | End | Cake 0 | Run-off 0 | Cake 20 | Cake 80 | Cake 20** |
|---|---|---|---|---|---|---|---|
| Dry solids content (DS), g/100 g | 82.5 | 83.2 | 97.6 | 77.8 | 99.8 | 99.3 | 100 |
| pH 1:1 | 3.6 | 3.8 | 3.9 | 3.9 | 3.9 | 3.9 | 3.9 |
| Cond., mS/cm | 0.21 | 0.22 | 0.05 | 0.23 | 0.02 | 0.01 | 0.02 |
| Ash, % | 0.38 | 0.39 | 0.09 | 0.41 | 0.03 | 0.02 | 0.03 |
| Colour, ICUMSA | 2800 | 3000 | 500 | 3900 | 170 | 60 | 150 |
| Carbohydrate content, % on dry solids (DS) oligosaccharides | 2.5 | 2.4 | 0.5 | 3.1 | — | — | — |
| glucose | 4.5 | 4.6 | 1.1 | 5.4 | 0.7 | 0.5 | 0.7 |
| xylose | 56.6 | 56.8 | 93.5 | 45.6 | 98.4 | 97.4 | 99.2 |
| galact. + rhamn. | 15.2 | 15.2 | 2.2 | 19.4 | ** | * | * |
| arabinose | 1.9 | 1.9 | 0.3 | 2.2 | ** | — | — |
| mannose | 12.5 | 12.4 | 1.9 | 16.5 | 0.7 | — | 0.5 |

*included in the xylose content.

EXAMPLE 5

The procedure was essentially similar to that of Example 4, with the following exceptions:

The xylose-containing solution to be treated was a xylose fraction obtained from a calcium-base sulphite cooking liquor of birch by chromatographic separation (the ion exchange resin with which the columns were packed was in Ca$^{2+}$ form), having a xylose content of 56.1% on dry solids (RDs). The solution was evaporated to a dry solids content (RDs) of 87.0 g/100 g, and the crystallization mass obtained was seeded at a supersaturation of 1.40 by adding ground dry xylose in a quantity of 0.12% of the amount of xylose in the crystallization mass. The crystallization mass was cooled from 66° C. to 26.6° C. by linear cooling during 91 hours.

The supersaturation remained nearly invariant. The crystallization mass was centrifuged after two hours from completion of the cooling programme (at that point, the temperature was 25° C.) as in Example 4.

The results are shown in Tables 10 and 11 below, in which the terms and abbreviations have the same meanings as in Example 4.

TABLE 10

Results of different centrifugations

| | Yield in centrifugation, % | |
|---|---|---|
| | RDs/RDs | X/X |
| Centrifugation 1, no washing | 39 | 61 |
| Centrifugation 2, washing 20 ml | 36 | 57 |
| Centrifugation 3, washing 80 ml | 28 | 47 |
| Centrifugation 4 | 34 | 56 |

TABLE 11

Analysis results of crystallization

| | Begin | End | Cake 0 | Run-off 0 | Cake 20 | Cake 80 | Cake 20** |
|---|---|---|---|---|---|---|---|
| Dry solids content (DS), g/100 g | 84.2 | 84.2 | 96.3 | 78.5 | 97.8 | 98.8 | 99.2 |
| pH 1:1 | 3.2 | 3.2 | 3.4 | 3.2 | 3.4 | 3.7 | 3.5 |
| Cond., mS/cm | 0.65 | 0.64 | 0.22 | 0.84 | 0.16 | 0.06 | 0.14 |
| Ash, % | 1.16 | 1.16 | 0.40 | 1.51 | 0.29 | 0.11 | 0.24 |
| Colour, ICUMSA | 3900 | 4300 | 1000 | 6300 | 620 | 70 | 410 |
| Carbohydrate content, % on dry solids (DS) oligosaccharides | 2.2 | 2.3 | 0.7 | 5.4 | 0.4 | 0.0 | 0.5 |
| glucose | 4.8 | 4.8 | 1.5 | 6.7 | 1.0 | * | 0.8 |
| xylose | 59.0 | 58.4 | 90.6 | 38.6 | 93.0 | 98.6 | 94.9 |
| galact. + rhamn. | 14.1 | 14.1 | 4.8 | 1.9.6 | 3.3 | * | * |
| arabinose | * | * | * | * | * | — | * |
| mannose | 10.6 | 10.6 | 2.5 | 15.1 | 1.6 | — | 0.9 |

*included in the xylose content.

EXAMPLE 6

Precipitation Crystallization 150 l of a xylose fraction obtained from a magnesium-base sulphite cooking liquor of beechwood by chromatographic separation (as in Example 2) and containing about 105 kg of dry solids, xylose purity 39.3%, was evaporated under vacuum at about 60° C. to a volume of about 80 l. Seeding at 58° C. with 25 g of ground xylose at a supersaturation of 2.24, whereafter the crystallization mass was transferred into a 100 l crystallizer.

The crystallization mass was subjected to linear cooling with simultaneous stirring from 58° C. to about 20° C. (viscosity 190 Pas measured with a Brookfield viscometer, type RVDV-I+) in about 25 hours. During that time, the supersaturation decreased initially to 1.66 in 3.7 hours, thereafter increased to 1.93 (time from seeding 20.9 h, temperature 30.7° C.) and subsequently again gradually decreased (at 20° C. the supersaturation was about 1.70). The crystallization mass was further stirred at about 20° C. A pressure filter Larox type PF 0.1 H2 was employed to separate the crystal fraction from the crystallization mass. Samples (a 20–200 g) were taken at different times from the crystallization mass to separate the mother liquid, and stirring of the remainder of the crystallization mass in the precipitation range was continued. Prior to filtration of the crystallization mass, the temperature of the mass was raised to about 30° C. to diminish the viscosity.

74.3 hours from the seeding, the viscosity of the sample of crystallization mass was 66 Pas at about 30° C. The sample of crystallization mass was filtered with the above-mentioned Larox pressure filter, initially using a filtering pressure of 13 bar for 15 minutes, and thereafter a filtering pressure of 14.5 bar for five minutes. The crystal cake obtained had a thickness of about 2.5 cm. The dry solids yield in crystallization mass prior to filtration was 20.2% and the xylose yield 50.4%. The analysis results are shown in Table 12 below, in which the terms and abbreviations correspond to those employed in the previous examples. Furthermore, the abbreviation Filtr. means crystallization mass supplied to the filter.

The tests carried out showed that the xylose yield and purity were influenced by the stirring time of the crystallization mass in the precipitation range (in this case, in a temperature range of about 20–30° C.). The xylose purity of the filtered crystal fraction was 83.8% at best (the time from seeding was 76.2 h; the viscosity of the crystallization mass was 66 Pas at 29.8° C.; filtration at 14.5 bar for five minutes), the xylose purity of the filtrate, i.e. run-off, was 18.1% at its lowest (time from seeding 220 h; viscosity of crystallization mass 59 Pas at 29.2° C.; filtration at 13–14 bar for 15 minutes). The xylose yield into crystals of crystallization mass was 63.2% at its highest (time from seeding 49.3 h).

TABLE 12

Analysis results of precipitation crystallization

|  | Begin | Filtr. | Crystal cake | Run-off |
|---|---|---|---|---|
| Dry solids content (DS), g/100 g | 89.2 | 88.0 | 93.3 | 79.2 |
| pH (solution 30–50-%) | 2.5 | 2.6 | 2.6 | 2.6 |
| pH 5% | 2.9 | 2.9 | 3.0 | 3.0 |
| Cond. (from solution containing 5% d.s.), mS/cm | 2.22 | 2.20 | 1.16 | 2.64 |
| Ash, % | 3.99 | 3.96 | 2.08 | 4.39 |
| Colour, ICUMSA | 14000 | 15000 | 6800 | 19600 |
| Carbohydrate content, % on dry solids (DS) |  |  |  |  |
| glucose | 2.7 | 2.6 | 1.8 | 3.2 |
| xylose | 40.1 | 40.5 | 74.5 | 22.4 |
| galact. + rhamn. | 3.7 | 3.8 | 1.8 | 4.6 |
| arabinose | 0 | 0 | 0 | 0 |
| mannose | 3.6 | 0.7 | 0.3 | 4.5 |

EXAMPLE 7

Precipitation Crystallization

If not otherwise stated, the procedure was similar to that of Example 6. The xylose-containing solution to be treated (20.5 kg) had been obtained by combining a xylose fraction obtained from a magnesium-base sulphite cooking liquor of beechwood by chromatographic separation and an aqueous solution of the crystal cake obtained from the previous precipitation tests. The solution had a dry solids content (DS) of 62.7% and a xylose purity of 53.0%.

The solution was evaporated to a dry solids content (DS) of 89.7%. 13.4 kg of the crystallization mass obtained was transferred into a 10 l crystallizer. Seeding at 65° C. with 5 g of ground xylose (crystal size 50 μm) at a supersaturation of 1.96 and linear cooling from 65° C. to about 20° C. in about 17 hours. During that time, the supersaturation decreased to 1.71, and it remained in the range 1.70–1.76 when the crystallization mass was stirred in the precipitation range (at a temperature of 20–22° C.). After 21.5 hours from seeding (viscosity 183 Pas at 22° C.), the crystallization mass was heated to 32° C. and filtered with a pressure filter (15 minutes, filtering pressure 13.5 bar).

The dry solids yield into crystals of crystallization mass prior to filtration was 38.1% and the xylose yield 72.1%. The analysis results are shown in Table 13 below, in which the terms and abbreviations correspond to those employed in Example 6.

TABLE 13

Analysis results of precipitation crystallization

|  | Begin | Filtr. | Crystal cake | Run-off |
|---|---|---|---|---|
| Dry solids content (DS), g/100 g | 89.7 | 89.9 | 94.8 | 83.7 |
| pH 5% | 3.1 | 3.1 | 3.2 | 3.0 |
| Cond. (from solution containing 5% d.s.), mS/cm | 2.22 | 2.22 | 1.23 | 3.02 |
| Ash, % | 4.00 | 4.00 | 2.22 | 5.44 |
| Colour, ICUMSA | 13000 | 13400 | 700 | 20000 |
| Carbohydrate content, % on dry solids (DS) |  |  |  |  |
| glucose | 2.2 | 2.3 | 1.2 | 3.1 |
| xylose | 52.5 | 52.8 | 78.0 | 29.2 |
| galact. + rhamn. | 3.2 | 3.2 | 1.5 | 4.3 |
| arabinose | 0 | 0 | 0 | 0 |
| mannose | 2.6 | 2.6 | 1.23 | 3.8 |

What is claimed is:

1. A method for crystallizing and recovering xylose from an aqueous solution of xylose consisting essentially of:

(a) concentrating a xylose-containing solution having a xylose purity of 30–60%, based on xylose in the dry solids contained in said solution, under conditions effective to produce a solution of xylose that is supersaturated with xylose;

(b) crystallizing the supersaturated xylose solution; and (c) recovering xylose crystals therefrom.

2. A method as claimed in claim 1, characterized in that the xylose-containing solution is a xylose-containing hydrolysate of biomass.

3. A method as claimed in claim 1, characterized in that the xylose-containing solution is a xylose-containing by-product fraction from the wood processing industry.

4. A method as claimed in claim 3, characterized in that the xylose-containing solution is a prehydrolysate or posthydrolysate.

5. A method as claimed in claim 3, characterized in that the xylose-containing solution is a sulphite cooking liquor, part thereof or concentrate therefrom.

6. A method as claimed in claim 5, characterized in that the xylose-containing solution is a concentrate chromatographically obtained from sulphite cooking liquor.

7. A method as claimed in claim 1, characterized in that the xylose-containing solution is supersaturated with xylose by evaporation.

8. A method as claimed in claim 6, characterized in that the xylose-containing solution is concentrated to a dry solids content of 75–95% by weight.

9. A method as claimed in claim 1, characterized in that xylose is crystallized from the supersaturated solution by cooling.

10. A method as claimed in claim 9, characterized in that the supersaturated solution is cooled during 10–100 hours.

11. A method as claimed in claim 10, characterized in that the xylose-containing solution has a xylose purity of not more than 50%, based on xylose in the dry solids contained in said solution, and the cooling is performed during 10–50 hours.

12. A method as claimed in claim 11, characterized in that the supersaturation of the solution in respect of xylose is 1.4–3.0 during the crystallization.

13. A method as claimed in claim 11, characterized in that the crystals are recovered by filtration.

14. A method as claimed in claim 13, characterized in that the crystallization mass is heated to facilitate recovery of crystals.

15. A method as claimed in claim 13, characterized in that the crystallization mass is diluted by adding water or a xylose-containing solution to facilitate recovery of crystals.

16. A method as claimed in claim 11, characterized in that the crystals obtained are used to prepare a new crystallization mass.

17. A method as claimed in claim 11, characterized in that the crystals obtained are recrystallized.

18. A method as claimed in claim 10, characterized in that the xylose-containing solution has a xylose purity of at least about 40%, based on xylose in the dry solids contained in said solution, and the cooling is performed during 30–100 hours.

19. A method as claimed in claim 18, characterized in that the supersaturation of the solution in respect of xylose is 1.1–1.7 during the crystallization.

20. A method as claimed in claim 18, characterized in that the crystals are recovered by centrifugation.

21. A method as claimed in claim 18, characterized in that the crystals obtained are recrystallized.

22. A method as claimed in claim 18, characterized in that the run-off obtained is precipitated and the crystal fraction is recovered.

23. A method as claimed in claim 9, characterized in that the cooling is performed in the temperature range of 20–80° C.

24. A method as claimed in claim 23, characterized in that the cooling is performed in the temperature range of 25–65° C.

25. A method as claimed in claim 1, characterized in that the xylose-containing solution is concentrated to a dry solids content of 82–95% by weight, crystallized by cooling and mixing at a final temperature for a total of 1–4 days, the crystal fraction is separated and dissolved in water or in an aqueous solution containing xylose, to give a solution having a xylose purity in excess of 40% which is cooled in the temperature range 70–20° C. during 30–100 hours, the supersaturation in respect of xylose being 1.1–1.7, and the crystals formed are recovered.

26. A method as claimed in claim 11, characterized in that the xylose-containing solution is concentrated to a dry solids content of 75–88% by weight, cooled in the temperature range 70–20° C. during 30–100 hours, the supersaturation in respect of xylose being 1.1–1.7, the crystals formed are recovered, and the run-off which has a dry solids content of 82–95% by weight or the dry solids content of which is adjusted to be in this range by concentration or dilution is crystallized by cooling during 10–100 hours in the temperature range 80–20° C., and the crystal fraction is recovered.

27. A method as claimed in claim 1, wherein said xylose purity is from 30–50% and said conditions comprise a supersaturation of 1.4 to 3.0 and seeding said xylose-containing solution with xylose crystals in an amount of at least ten times full seeding.

28. A method as claimed in claim 1, wherein said xylose purity is in excess of 40% and said conditions comprise a supersaturation of 1.1 and 1.7 and seeding said xylose-containing solution with xylose crystals in an amount approximately corresponding to full seeding.

29. A method for crystallizing and recovering xylose from an aqueous solution of xylose consisting essentially of:

(a) concentrating a xylose-containing solution having a xylose purity of 30–60%, based on xylose in the dry solids contained in said solution, to produce a solution of xylose that has a supersaturation value within the range of 1.1 to 3.0;

(b) crystallizing the solution provided in step (a) at a temperature within the range of 20–80° C. for a crystallization inducing time of less than 100 hours; and (c) recovering xylose crystals therefrom.

* * * * *